United States Patent
Björnemo (10) Patent No.: US 9,575,205 B2
(45) Date of Patent: Feb. 21, 2017

(54) UNCERTAINTY-BASED FREQUENCY-SELECTED INVERSION OF ELECTROMAGNETIC GEOPHYSICAL DATA

(71) Applicant: PGS Geophysical AS, Lysaker (NO)

(72) Inventor: Erik Björnemo, Knivsta (SE)

(73) Assignee: PGS Geophysical AS, Olso (NO)

( * ) Notice: Subject to any disclaimer, the term of this patent is extended or adjusted under 35 U.S.C. 154(b) by 695 days.

(21) Appl. No.: 13/744,173

(22) Filed: Jan. 17, 2013

(65) Prior Publication Data
US 2014/0207379 A1  Jul. 24, 2014

(51) Int. Cl.
*G01V 3/12* (2006.01)
*G01V 3/38* (2006.01)

(52) U.S. Cl.
CPC ..................... *G01V 3/38* (2013.01)

(58) Field of Classification Search
CPC ............ G01V 1/00; G01V 3/12; G01V 3/083; G01V 1/28; G01V 2210/123; G01V 2210/6163; G01V 99/005; E21B 41/0092; E21B 43/16; E21B 43/01; G06F 19/00; G06N 7/005
USPC .......... 324/334, 337, 332; 702/6, 11, 13, 14; 703/2, 6, 10, 5
See application file for complete search history.

(56) References Cited

U.S. PATENT DOCUMENTS

| | | | |
|---|---|---|---|
| 4,617,518 A | 10/1986 | Srnka | |
| 6,400,148 B1 * | 6/2002 | Meyer | G01V 3/32 324/300 |
| 6,549,854 B1 * | 4/2003 | Malinverno et al. | 702/16 |
| 6,944,546 B2 * | 9/2005 | Xiao et al. | 702/6 |
| 7,640,110 B2 | 12/2009 | Abubakar et al. | |
| 8,274,288 B2 | 9/2012 | Ziolkowski et al. | |
| 8,275,592 B2 | 9/2012 | Lovatini et al. | |
| 2007/0299614 A1 * | 12/2007 | Dewarrat | G01V 1/28 702/16 |
| 2008/0061790 A1 * | 3/2008 | Strack | 324/336 |
| 2008/0094066 A1 * | 4/2008 | Watts | 324/337 |
| 2009/0010104 A1 * | 1/2009 | Leaney | G01V 1/364 367/47 |
| 2009/0265111 A1 * | 10/2009 | Helwig et al. | 702/7 |
| 2009/0306900 A1 | 12/2009 | Jing et al. | |
| 2010/0179761 A1 * | 7/2010 | Burtz et al. | 702/6 |
| 2010/0185422 A1 * | 7/2010 | Hoversten | 703/2 |

(Continued)

OTHER PUBLICATIONS

Johan Mattsson, Et Al. "Noise reduction and error analysis for a Towed EM System", 2012, pp. 1-5, SEG Las Vegas 2012 Annual Meeting.

(Continued)

*Primary Examiner* — John Breene
*Assistant Examiner* — Jeffrey Aiello (57) ABSTRACT

Disclosed are methods and apparatus using frequency-selected electromagnetic inversion to obtain sub-surface geophysical characteristics. One embodiment relates to a computer-implemented method for inverting an electromagnetic geophysical data signal to obtain an earth response. The method involves computing uncertainties associated with an electromagnetic geophysical data signal and selecting subset of frequencies based on the uncertainties. The electromagnetic geophysical data signal may then be inverted for the subset of the frequencies to determine the earth response. Other embodiments, aspects, and features are also disclosed.

20 Claims, 7 Drawing Sheets

(56) References Cited

U.S. PATENT DOCUMENTS

| | | | |
|---|---|---|---|
| 2010/0326669 A1* | 12/2010 | Zhu | G01V 11/00 |
| | | | 166/369 |
| 2011/0012601 A1 | 1/2011 | Hobbs et al. | |
| 2011/0264421 A1* | 10/2011 | Jing et al. | 703/2 |
| 2011/0307438 A1* | 12/2011 | Fernandez Martinez | G06N 7/005 |
| | | | 706/52 |
| 2011/0313737 A1 | 12/2011 | Hadj-Sassi et al. | |
| 2012/0080197 A1* | 4/2012 | Dickens | G01V 3/083 |
| | | | 166/369 |
| 2012/0182017 A1 | 7/2012 | Mattsson et al. | |
| 2013/0054201 A1* | 2/2013 | Posamentier et al. | 703/2 |
| 2013/0185033 A1* | 7/2013 | Tompkins et al. | 703/2 |
| 2015/0160363 A1* | 6/2015 | Hornbostel et al. | 324/337 |

OTHER PUBLICATIONS

Wenyi Hu, Et Al. "A sensitivity controllable target-oriented tomography algorithm", 2012, pp. 1-5, SEG Las Vegas 2012 Annual Meeting.

Frazer Barclay, Et Al, "Seismic Inversion: Reading Between the Lines", 2008, pp. 42-63, Oilfield Review.

Jan Petter Morten, Astrid Kornberg Bjørke, Trude Støren, CSEM data uncertainty analysis for 3D inversion, SEG Houston 2009 International Exposition and Annual Meeting, Date: Oct. 25-30, 2009, pp. 724-728.

\* cited by examiner

UNCERTAINTY-BASED FREQUENCY-SELECTED INVERSION OF ELECTROMAGNETIC GEOPHYSICAL DATA

BACKGROUND

Electromagnetic (EM) geophysical surveying involves imparting an electric field or a magnetic field into subsurface Earth formations and measuring electric and/or magnetic field amplitudes by measuring voltage differences induced in electrodes, antennas and/or interrogating magnetometers. The electric and/or magnetic fields are induced in response to the electric and/or magnetic field imparted into the Earth's subsurface, and inferences about the spatial distribution of conductivity of the Earth's subsurface are made from recordings of the induced electric and/or magnetic fields. Such spatial distributions may be used to assist in the location and recovery of hydrocarbons, such as oil or natural gas.

Methods for electromagnetic surveying have been adapted for use in marine environments. The electric and/or magnetic fields may be induced by a electromagnetic source located in a body of water, for example, towed behind a survey vessel. Marine sensors have been devised for detecting electric and/or magnetic field signals resulting from imparting electric and/or magnetic fields into formations below the bottom of a body of water. Such marine sensors may be located in relatively fixed positions at or near the bottom of the body of water, and systems with towed electromagnetic receivers have also been devised. Methods for analyzing the data from the sensors to provide reliable estimates of spatial distributions of conductivity of the Earth's subsurface would be useful.

Note that the figures provided herewith are not necessarily to scale. They are provided for purposes of illustration to ease in the understanding of the presently-disclosed invention.

DETAILED DESCRIPTION

The present disclosure provides innovative techniques for inversion of electromagnetic geophysical data signals. As would be understood by one of ordinary skill in the art with the benefit of this disclosure, inversion of geophysical data is generally a computational process by which data are used to generate a model that is consistent with the data, the process of solving the inverse problem. The techniques include the use of quantitative uncertainty measures to select frequencies for the inversion. The inversion is then performed using the selected frequencies and not using the other (non-selected) frequencies.

Uncertainty-Driven Selection

Figure 1:
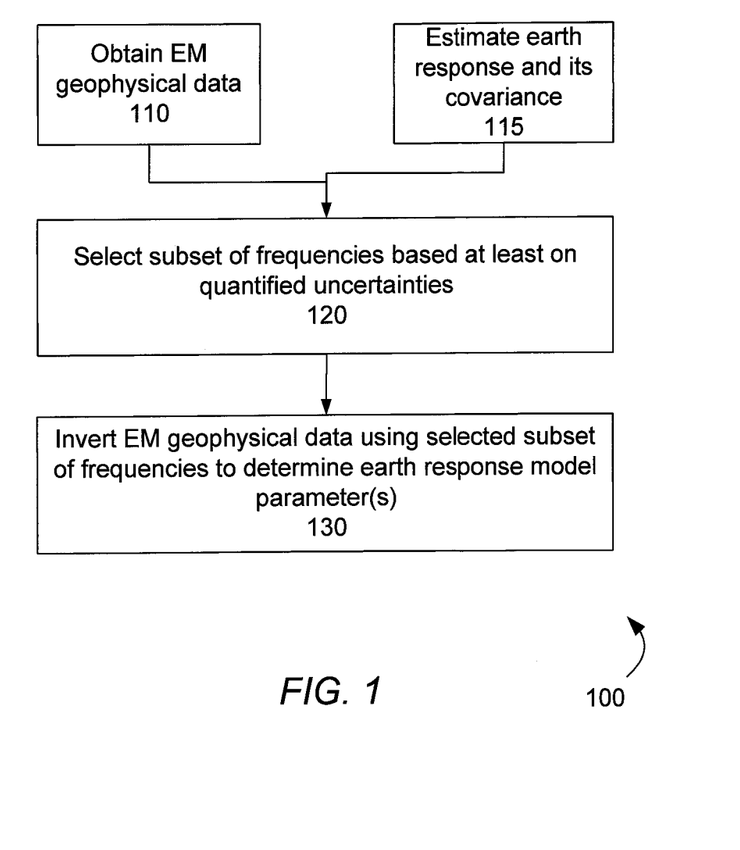
FIG. 1 is a flow chart showing, at a high-level, a method of uncertainty-based frequency-selected inversion of electromagnetic geophysical data in accordance with an embodiment of the invention.

FIG. 1 is a flow chart showing, at a high-level, a method 100 of uncertainty-based frequency-selected inversion of electromagnetic geophysical data in accordance with an embodiment of the invention. The method 100 may be performed in an automated manner using programmably-configured computer apparatus. For example, the computer apparatus may be at a data processing facility, for example.

The electromagnetic (EM) geophysical data may be originally acquired using EM surveying. The EM surveying may involve a controlled source emitting EM signals through the upper layers of the earth (and any present bodies of water and/or air) and a range of sensors measuring the resulting signals at other locations (or the same location).

Per block 110, EM geophysical data may be obtained by the programmably-configured computer apparatus. In one embodiment, the EM geophysical data may be obtained in a frequency domain form (i.e. as frequency spectra). In another embodiment, the EM geophysical data may be obtained in a time domain form (i.e. as time series data signals), and a time-to-frequency domain transformation may be applied to transform the data to a frequency domain (i.e. to frequency spectra). The time-to-frequency domain transformation may be a Fast Fourier Transformation (FFT).

Per block 115, the earth response g and its covariance matrix $\Gamma$ may be estimated. Consider that the time series data $d_t$ from one EM sensor may consist of the source signal $s_t$ convolved with the earth's impulse response $g_t$ and additional noise. In vector form, this may be represented as $$d = Sg + v \quad \text{(Eqn. 1)}$$

where S is the source signal matrix (in either time or frequency domain), g is the earth response (either the impulse response or the frequency response) and v is the noise. The earth response depends on the parameters of interest, namely the subsurface conductivity (indicative of hydrocarbons).

A probabilistic (Bayesian) estimate of the earth response g based on Gaussian distributions p(v|I) for the noise and p(g|I) for the response is given by $$\hat{g} = (R_g^{-1} + S^H R_v^{-1} S)^{-1}(R_g^{-1}\bar{g} + S^H R_v^{-1} d) \quad \text{(Eqn. 2)}$$

$$\Gamma = (R_g^{-1} + S^H R_v^{-1} S)^{-1} \quad \text{(Eqn. 3)}$$

where $\hat{g}$ may denote the posterior mean for the earth response g, and $\Gamma$ is its covariance (defining the uncertainty ellipsoid). Moreover, $\bar{g}$ denotes the prior expectation for the earth response g, $R_g$ denotes the covariance matrix of the earth response, and $R_v$ denotes the covariance matrix of the noise. As shown in Eqn. 3, the covariance matrix $\Gamma$ may be computed using source signal data and covariance information. If no prior information is available, the covariance matrix $\Gamma$ reduces to $(S^H R_v^{-1} S)^{-1}$. The above Bayesian estimate is an example and alternate estimates are possible.

Per block 120, a subset of frequencies may be selected based at least on quantified uncertainties associated with the EM geophysical data. In one example, the quantified uncertainties may be noise-to-signal ratios for frequencies in the EM geophysical data. Several other embodiments of this frequency selection using quantified uncertainties are described below in relation to FIGS. 2 through 6. Advantageously, by selecting the frequencies to be inverted using estimated uncertainty metrics (and optionally target-sensitivity metrics), the quality of the inversion may be improved while keeping the computational requirements at a manageable level.

Per block 130, the EM geophysical data may be inverted using the selected subset of frequencies to determine one or more parameters for an earth response model. Thereafter, from the earth response model, a sub-surface geophysical characteristic may be determined. Of particular interest, the sub-surface geophysical characteristic may be a sub-surface conductivity (or resistivity) which may indicate the presence of hydrocarbons.

Figure 2:
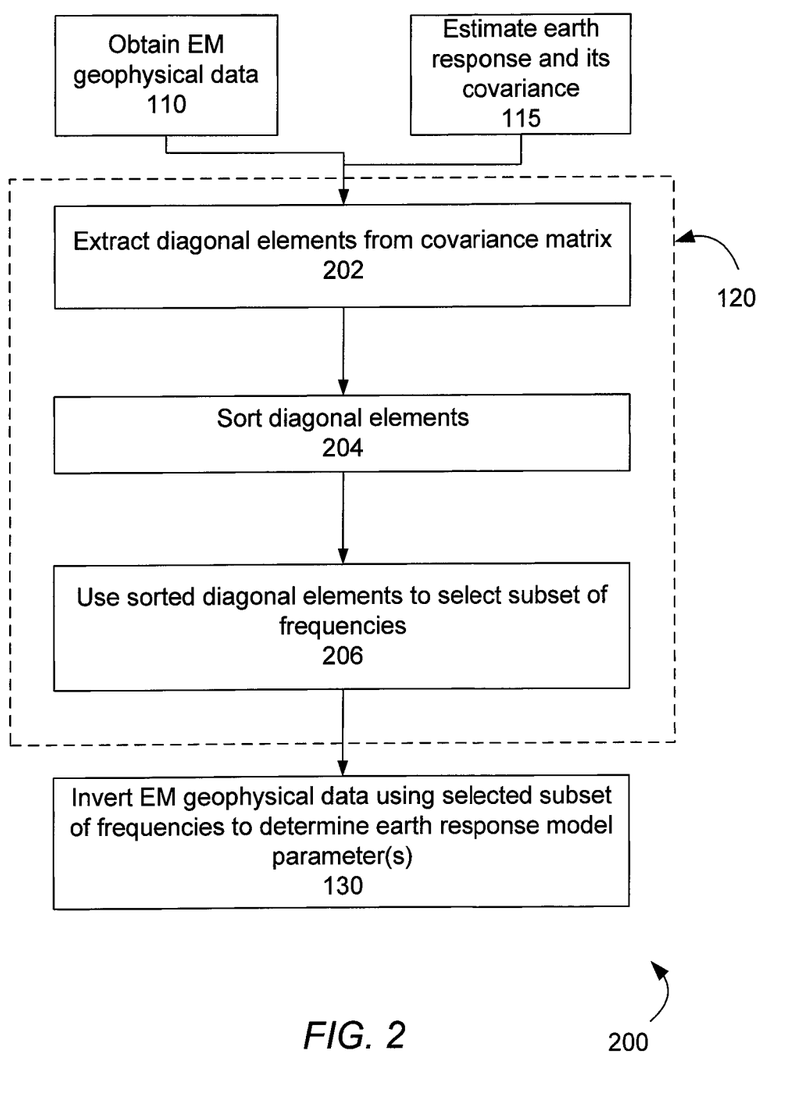
FIG. 2 is a flow chart showing a method of uncertainty-based frequency-selected inversion of electromagnetic geophysical data that involves sorting diagonal elements of a covariance matrix in accordance with an embodiment of the invention.

FIG. 2 is a flow chart showing a method of uncertainty-based frequency-selected inversion of electromagnetic geophysical data that involves sorting diagonal elements of a covariance matrix in accordance with an embodiment of the invention. Like the method 100 of FIG. 1, the method 200 of FIG. 2 includes the high-level steps of: obtaining the EM geophysical data per block 110; estimating the earth response and its covariance per block 115; frequency selection based at least on quantified uncertainties per block 120; and inverting the EM geophysical data using the selected subset of frequencies to determine one or more earth response parameters per block 130. In addition, FIG. 2 shows that the frequency selection step of block 120 may be implemented with the sub-steps indicated by blocks 202 through 206.

Assuming now that ĝ relates to the frequency response, the diagonal elements from the covariance matrix $\Gamma$ correspond to the quantified uncertainties (or errors or variances) of the individual frequencies. These diagonal elements may be extracted from the covariance matrix $\Gamma$ per block 202.

Per block 204, the diagonal elements may be sorted according to their magnitude. In other words, the frequencies may be ranked according to the diagonal elements in $\Gamma$, that is to say according to their individual quantitative uncertainty (or error or variance). In one embodiment, the diagonal elements may be sorted according to their magnitude in ascending order. In that case, the frequencies with the lowest quantitative uncertainty would be in the beginning of the sorted list. In another embodiment, the diagonal elements may be sorted according to their magnitude in descending order. In that case, the frequencies with the lowest quantitative uncertainty would be in the end of the sorted list.

Per block 206, the list of sorted diagonal elements is used to select the subset of frequencies for use in inverting the EM geophysical data so as to determine one or more parameters for the earth response model. In the example where the diagonal elements are sorted in an ascending order, a subset $\{f_{sub}\}$ of K frequencies from the beginning of the sorted list may be selected to use in the inversion. In the example where the diagonal elements are sorted in a descending order, a subset $\{f_{sub}\}$ of K frequencies from the end of the sorted list may be selected to use in the inversion.

Finally, per block 130 inversion is performed on the EM geophysical data using the K frequencies in the selected subset $\{f_{sub}\}$. The inversion may determine one or more parameters of the earth response model. Subsequently, the earth response model (with the parameters determined by the inversion) may be used to generate a map of the sub-surface resistivities.

The method 200 described above in relation to FIG. 2 does not take correlations into account, so if two frequencies have very correlated estimates they can still be chosen. The method 300 described below in relation to FIG. 3 takes correlations into account.

Figure 3:
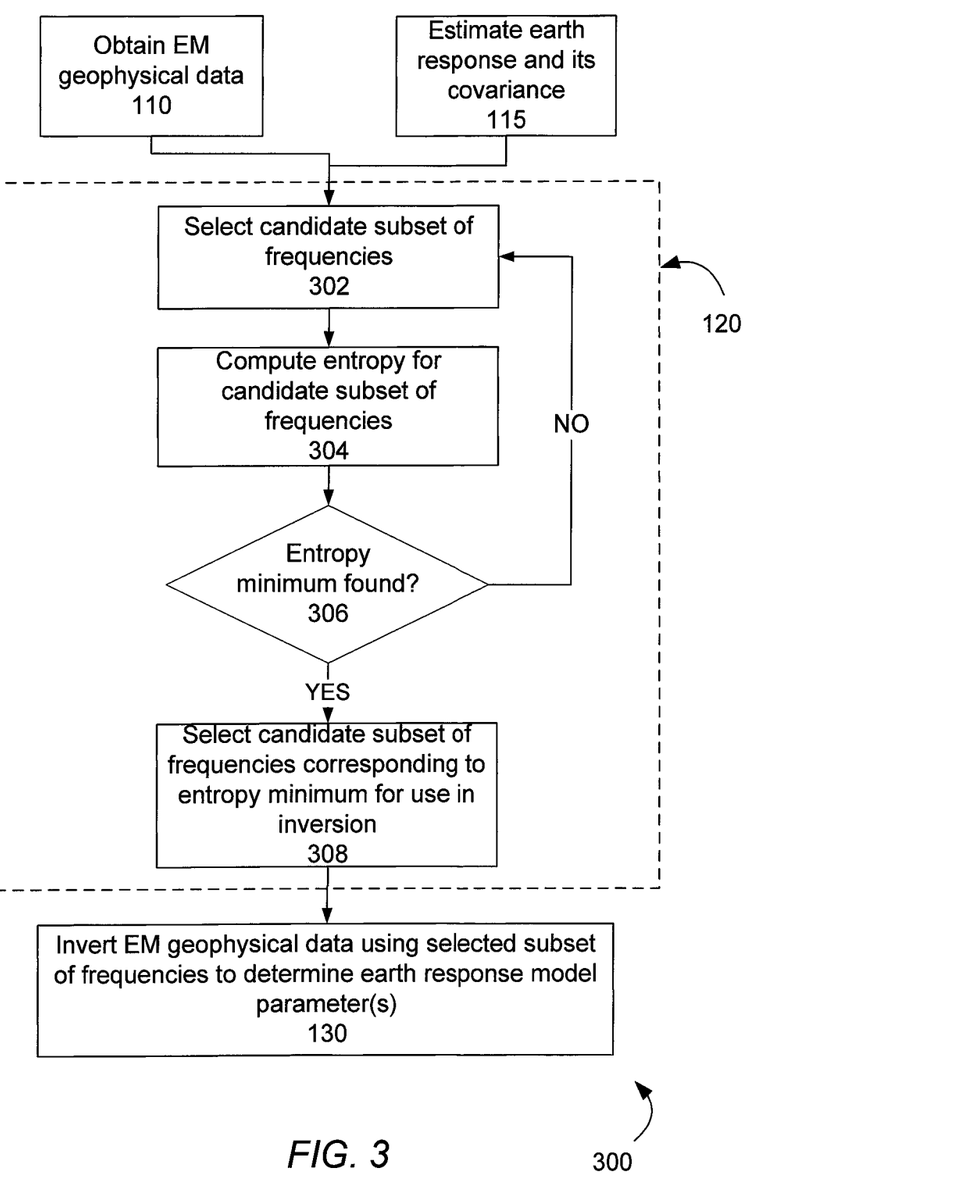
FIG. 3 is a flow chart showing a method of uncertainty-based frequency-selected inversion of electromagnetic geophysical data that involves computing entropy for candidate subsets of frequencies in accordance with an embodiment of the invention.

FIG. 3 is a flow chart showing a method 300 of uncertainty-based frequency-selected inversion of electromagnetic geophysical data that involves computing entropy for candidate subsets of frequencies in accordance with an embodiment of the invention. Like the method 100 of FIG. 1, the method 300 of FIG. 3 includes the high-level steps of: obtaining the EM geophysical data per block 110; estimating the earth response and its covariance per block 115; frequency selection based at least on quantified uncertainties per block 120; and inverting the EM geophysical data using the selected subset of frequencies to determine one or more earth response parameters per block 130. In addition, FIG. 3 shows that the frequency selection step of block 120 may be implemented with the sub-steps indicated by blocks 302 through 308.

The method 300 of FIG. 3 takes correlations into account by looking at the combined uncertainty of multiple frequencies, as given by the differential entropy (also referred to herein as simply "the entropy") $H_g$ of the posterior distribution p(g|d,l). In the above case, because it is Gaussian, we have the following equation.

$$H_g \propto \ln |\Gamma| \qquad \text{(Eqn. 4)}$$

As given in Eqn. 4, the entropy is proportional to the natural logarithm of the magnitude of the covariance matrix. Finding a subset of K frequencies that minimizes the entropy $H_g$ means that uncorrelated uncertainties would be preferred over correlated uncertainties. Take for instance the following two covariance matrices.

$$\begin{vmatrix} 1 & 0 \\ 0 & 0.8 \end{vmatrix}^{-1}, \begin{vmatrix} 1 & 0.5 \\ 0.5 & 1 \end{vmatrix}^{-1}$$

where both covariance matrices includes the same first frequency, but different second frequencies. The former covariance (on the left) has a smaller uncertainty although the latter covariance (on the right) has smaller individual uncertainties.

Consider now the frequency selection technique indicated by blocks 302 through 308 in FIG. 3. Per block 302, a candidate subset $\{f_{candidate}\}$ of K frequencies may be selected, and the entropy $H_g$ based on that candidate subset may be computed per block 304. Per block 306, a determination may then be made as to whether an entropy minimum has been found. In other words, a determination may be made as to whether the entropy for this candidate subset, or for another candidate subset already considered, corresponds to an entropy minimum.

If an entropy minimum has not yet been found, then the method 300 loops back to block 302 and a next candidate subset $\{f_{candidate}\}$ of K frequencies may be selected. The selection of the next candidate subset may use a search procedure with an aim of finding the subset having an entropy minimum. On the other hand, if an entropy minimum has been found, then the method 300 goes on to block 308 and selects the candidate subset $\{f_{candidate}\}$ of K frequencies that corresponds to the entropy minimum to be the subset $\{f_{sub}\}$ for use in the inversion. In summary, the method 300 of FIG. 3 chooses the subset $\{f_{sub}\}$ of K frequencies resulting in the smallest uncertainty as given by the differential entropy, which may be given by $\ln|(R_g^{-1}+S^H R_v^{-1} S)^{-1}|$.

In the Gaussian case described here, the above criterion corresponds to minimization of the determinant $|(R_g^{-1}+S^H R_v^{-1} S)^{-1}|$. This can be geometrically viewed as minimizing the volume of an "uncertainty ellipsoid". In non-Gaussian cases there is no such interpretation, but the idea of minimization of the differential entropy is still valid.

Uncertainty and Sensitivity Driven Selection

The methods described above in relation to FIGS. 1 to 3 select frequencies based on uncertainties, but they do not take the frequency-dependent sensitivity of the earth response into account. The methods described below in relation to FIGS. 4 and 5 select frequencies based on both uncertainty and sensitivity.

One Parameter Inversion

Figure 4:
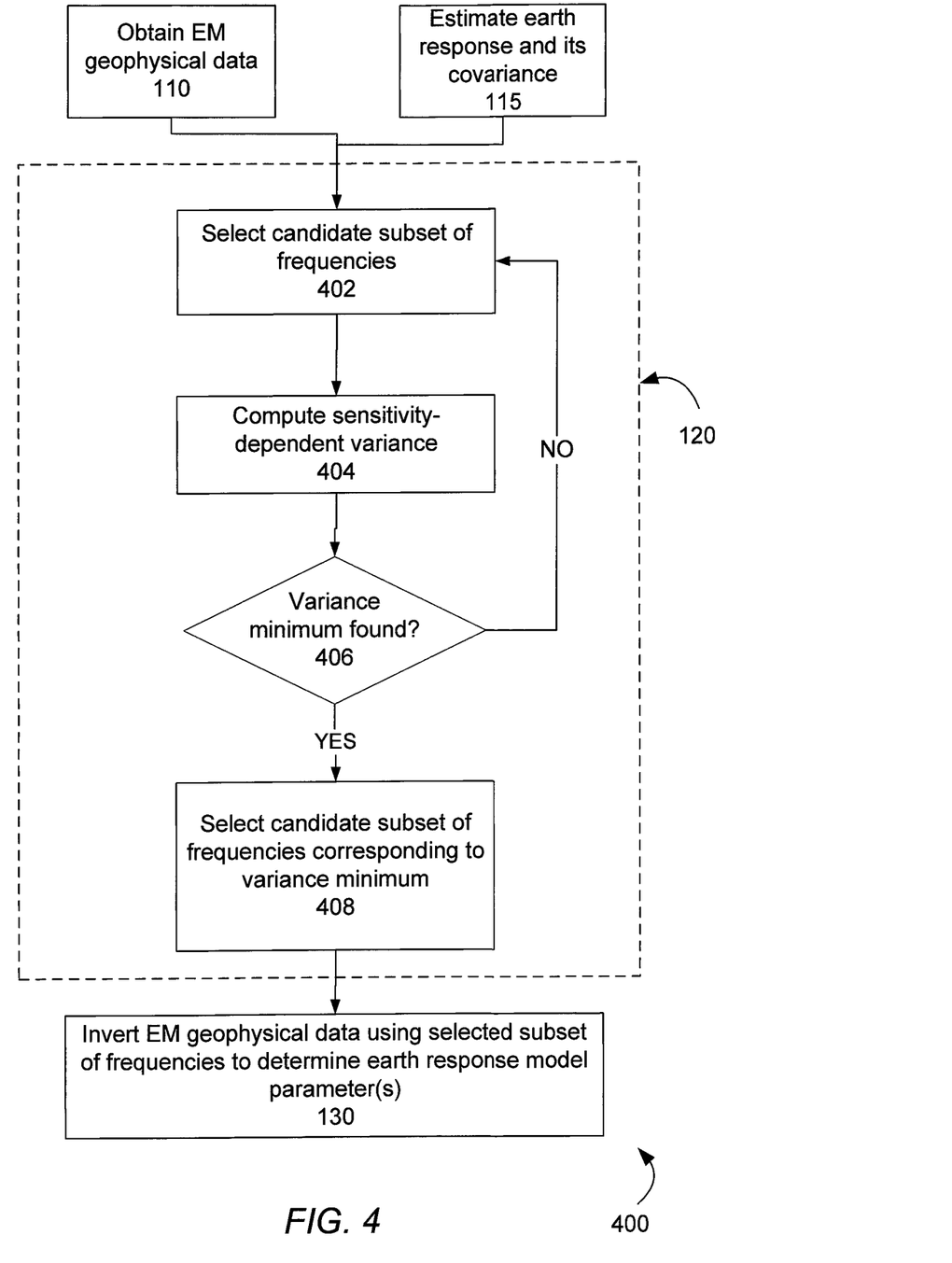
FIG. 4 is a flow chart showing a method of sensitivity and uncertainty based frequency-selected inversion of electromagnetic geophysical data that uses a single-parameter earth response model in accordance with an embodiment of the invention.

FIG. 4 is a flow chart showing a method 400 of sensitivity and uncertainty based frequency-selected inversion of electromagnetic geophysical data that uses a single-parameter earth response model in accordance with an embodiment of the invention. Like the method 100 of FIG. 1, the method 400 of FIG. 4 includes the high-level steps of: obtaining the EM geophysical data per block 110; estimating the earth response and its covariance per block 115; frequency selection based at least on quantified uncertainties per block 120; and inverting the EM geophysical data using the selected subset of frequencies to determine one or more earth response parameters per block 130. In addition, FIG. 4 shows that the frequency selection step of block 120 may be implemented with the sub-steps indicated by blocks 402 through 408. The method 400 of FIG. 4 relates to a one-parameter inversion technique that takes into account both uncertainty and sensitivity.

For illustration, consider the case where the background frequency response $g_b$—that is to say the response from an average sediment structure without horizontal variability—is well known from preceding calculations and so that we can focus on the remaining response $g_a$ (the response after subtraction of the background) in searching for a possible anomaly. Consider that the time series data $d_t$ from one EM sensor may consist of the source signal $s_t$ convolved with the earth's impulse response $g_t$ and additional noise. In vector form, the EM data may be expressed as follows.

$$d = S(g_b + g_a) + v \quad \text{(Eqn. 5)}$$

where S is the source signal matrix, $g = g_b + g_a$ is the earth response, and v is the noise. Re-arranging Eqn. 5 leads to the following:

$$\Delta \equiv d - S g_b = S g_a + v \quad \text{(Eqn. 6)}$$

where $\Delta$ is the EM data after subtracting the effect of the background frequency response.

Consider the case where we know the physical spatial shape of the anomaly (for instance from seismic data) and want to infer its resistivity $r_a$ (for example to distinguish water from hydrocarbons). In this case, we may use modeling tools to find a "response shape" $\tilde{g}_a$ such that $$g_a = \tilde{g}_a \lambda(r) \quad \text{(Eqn. 7)}$$

where $\lambda(r)$ is a one-to-one mapping from r to the strength $\lambda(r)$ of the response.

A Bayesian estimate of the strength $\lambda(r)$, and hence the resistivity of the anomaly via the one-to-one mapping, is given by the following.

$$\hat{\lambda}(r) = (\sigma_f^{-2} + g_a^H S^H R_v^{-1} S g_a)^{-1} (\sigma_f^{-2} \bar{\lambda}(r) + g_a^H S^H R_v^{-1} \Delta), \quad \text{(Eqn. 8)}$$

$$Q = (\sigma_f^{-2} + g_a^H S^H R_v^{-1} S g_a)^{-1}. \quad \text{(Eqn. 9)}$$

where the scalar uncertainty (variance) in the posterior-mean estimate is given by the matrix determinant $|Q|$. In accordance with an embodiment of the invention, a subset of frequencies is selected so as to minimize the sensitivity-dependent variance $|Q|$.

Consider now the frequency selection technique indicated by blocks 402 through 408 in FIG. 4. Per block 402, a candidate subset $\{f_{candidate}\}$ of K frequencies may be selected, and sensitivity-dependent variance $|Q|$ based on that candidate subset may be computed per block 404. Per block 406, a determination may then be made as to whether a variance minimum has been found. In other words, a determination may be made as to whether the sensitivity-dependent variance for this candidate subset, or for another candidate subset already considered, corresponds to a variance minimum.

If a variance minimum has not yet been found, then the method 400 loops back to block 402 and a next candidate subset $\{f_{candidate}\}$ of K frequencies may be selected. The selection of the next candidate subset may use a search procedure with an aim of finding the subset corresponding to a variance minimum. On the other hand, if a variance minimum has been found, then the method 400 goes on to block 408 and selects the candidate subset $\{f_{candidate}\}$ of K frequencies that corresponds to the variance minimum to be the subset $\{f_{sub}\}$ The subset $\{f_{sub}\}$ of frequencies may then be used for the inversion per block 130.

In summary, the method 400 of FIG. 4 selects the subset $\{f_{sub}\}$ of K frequencies resulting in the smallest sensitivity-dependent variance, as given by the determinant $|Q|$ of the K×K matrix Q. In the case of large prior uncertainty, the matrix Q approaches $(g_a^H S^H R_v^{-1} S g_a)^{-1}$. While the method 400 of FIG. 4 provides one specific sensitivity function for use in the selection process, other sensitivity functions may be used. The sensitivity function need not be tightly coupled to a specific shape in frequency space. The sensitivity function may more generally reflect a range of frequencies having good sensitivities. For example, another sensitivity function may be a function averaged over a range of anomalies of different shapes. Such a sensitivity function may be considered to provide an average anomaly shape that may be averaged over an uncertainty regarding what to expect. The uncertainty may optionally include uncertainty about the background.

Linearized Multi-Parameter Inversion

Figure 5:
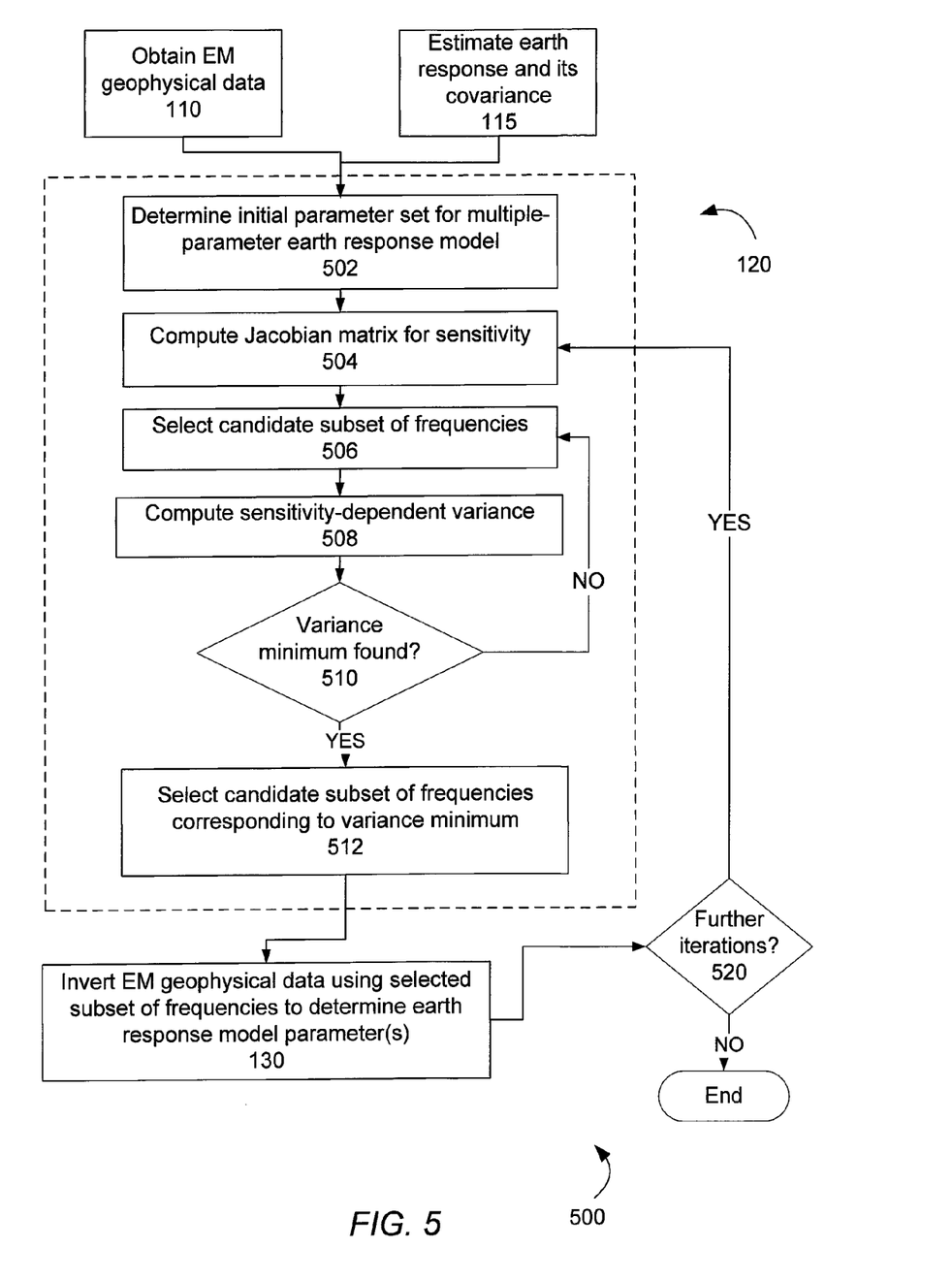
FIG. 5 is a flow chart showing a method of sensitivity and uncertainty based frequency-selected inversion of electromagnetic geophysical data that uses a multiple-parameter earth response model in accordance with an embodiment of the invention.

FIG. 5 is a flow chart showing a method 500 of sensitivity and uncertainty based frequency-selected inversion of electromagnetic geophysical data that uses a multiple-parameter earth response model in accordance with an embodiment of the invention. Like the method 100 of FIG. 1, the method 500 of FIG. 5 includes the high-level steps of: obtaining the EM geophysical data per block 110; estimating the earth response and its covariance per block 115; frequency selection based at least on quantified uncertainties per block 120; and inverting the EM geophysical data using the selected subset of frequencies to determine one or more earth response parameters per block 130. In addition, FIG. 5 shows that the frequency selection step of block 120 may be implemented with the sub-steps indicated by blocks 502 through 512. The method 500 of FIG. 5 relates a linearized multi-parameter inversion technique that takes into account both uncertainty and sensitivity.

Assume a model for the earth response g that depends on multiple parameters in a parameter vector m, i.e. g=g(m). The parameter vector m contains physical parameters such as resistivity and anisotropy of the earth model's layers and cells. The mapping from m to g may be highly non-linear. Further assume that an estimated earth response ĝ and an estimated covariance matrix Γ may be obtained as described above in relation to Eqns. 2 and 3.

The search for the response model parameter vector m may begin by obtaining an initial parameter vector $m_0$. These initial parameters may be determined from prior information (such as seismic information). The earth response g(m) may then be linearized around the starting point $m_0$ as follows.

$$g(m)=g(m_0)+J_g(m_0)(m-m_0)+o(\|m-m_0\|), \quad \text{(Eqn. 10)}$$

where $J_g(m_0)$ is the Jacobian of g(m) at $m_0$. The Jacobian $J_g$ quantifies—to first order—how sensitive the response is to changes in the earth parameters m at the starting point $m_0$. An estimated response ĝ may be considered to be the response g plus uncertainty/noise as follows.

$$\hat{g}(m)=g(m)+e \quad \text{(Eqn. 11)}$$

where the uncertainty/noise e is characterized by the covariance matrix Γ. By neglecting the term $o(\|m-m_0\|)$ in Eqn. 10, we obtain the following linearized model for the estimated response ĝ.

$$\hat{g}(m)=g(m_0)+J_g(m_0)(m-m_0)+e \quad \text{(Eqn. 12)}$$

With this linearized model and using Bayesian-Gaussian procedure as above, the estimated model parameters are given by $$\hat{m}=(R_m^{-1}+J_g^H\Gamma^{-1}J_g)^{-1}(R_m^{-1}m_0+J_g^H\Gamma^{-1}(\hat{g}(m)-g(m_0)+J_g m_0)), \quad \text{(Eqn. 13)}$$

$$P=(R_m^{-1}+J_g^H\Gamma^{-1}J_g)^{-1}. \quad \text{(Eqn. 14)}$$

where $R_m$ denotes the covariance matrix (prior uncertainty) of the modeled earth response. If the prior uncertainty $R_m$ is large, then P reduces to $(J_g^H\Gamma^{-1}J_g)^{-1}$.

The covariance matrix P may be considered to represent an "uncertainty ellipsoid," and the determinant $|P|=|(R_m^{-1}+J_g^H\Gamma^{-1}J_g)^{-1}|$ may be considered to represent the "volume" of the uncertainty ellipsoid. In general, frequencies at which the response is sensitive to parameter changes are good to use and this is reflected in the expression for P in that large elements in the Jacobian makes the uncertainty smaller. However, the uncertainty in ĝ is also of importance, and so the above expression for |P| strikes a balance between sensitivity and uncertainty.

It might appear that the use of more frequencies is always better because the uncertainty generally decreases with more frequencies. However, applicant has determined that there are advantageous reasons to use a subset of frequencies, rather than all the available frequencies. One reason is numerical stability issues caused by the approximations used in calculating the Jacobian. Small derivatives can become inaccurately calculated, and when the expression is inverted these errors may increase dramatically. This is especially true when the initial uncertainty is large. A second reason is that by reducing the number of frequencies, we can reduce the computations for the next iteration of the search (and make it more robust as we then exclude noisy frequencies having poor sensitivity).

Consider now the frequency selection technique indicated by blocks 502 through 512 in FIG. 5. Per block 502, an initial parameter set, represented by the vector $m_0$ may be determined using prior information, such as seismic information, for the multiple-parameter earth response model g(m). This initial parameter vector $m_0$ may be used to start the search for the earth response model parameters m.

Per block 504, the Jacobian matrix $J_g(m_0)$ may be computed. As described above, the Jacobian matrix quantifies, to first order, the sensitivity of the response to changes in the parameter vector m at the initial parameter vector $m_0$.

Per block 506, a candidate subset $\{f_{candidate}\}$ of K frequencies may be selected, and sensitivity-dependent variance |P| based on that candidate subset may be computed per block 508. Per block 510, a determination may then be made as to whether a variance minimum has been found. In other words, a determination may be made as to whether the sensitivity-dependent variance for this candidate subset, or for another candidate subset already considered, corresponds to a variance minimum.

If a variance minimum has not yet been found, then the method 500 loops back to block 506 and a next candidate subset $\{f_{candidate}\}$ of K frequencies may be selected. The selection of the next candidate subset may use a search procedure with an aim of finding the subset corresponding to a variance minimum. On the other hand, if a variance minimum has been found, then the method 500 goes on to block 512 and selects the candidate subset $\{f_{candidate}\}$ of K frequencies that corresponds to the variance minimum to be the subset $\{f_{sub}\}$. The subset $\{f_{sub}\}$ of frequencies may then be used for the inversion per block 130.

The above describes one iteration of the Jacobian-based technique. Further iterations may be performed to further improve the earth response model parameters that are obtained. If further iteration is desired per block 520, then the method 500 may loop back to block 504 and re-compute the Jacobian. The Jacobian is re-computed using the model parameters determined by the inversion in block 130 to be the new initial parameter set.

Multiple iterations may be used. In each iteration, the Jacobian may be re-computed using the frequency subset selected in the previous iteration. In this way, the set of frequencies used may be reduced for each iteration as a better solution is approached.

Figure 6:
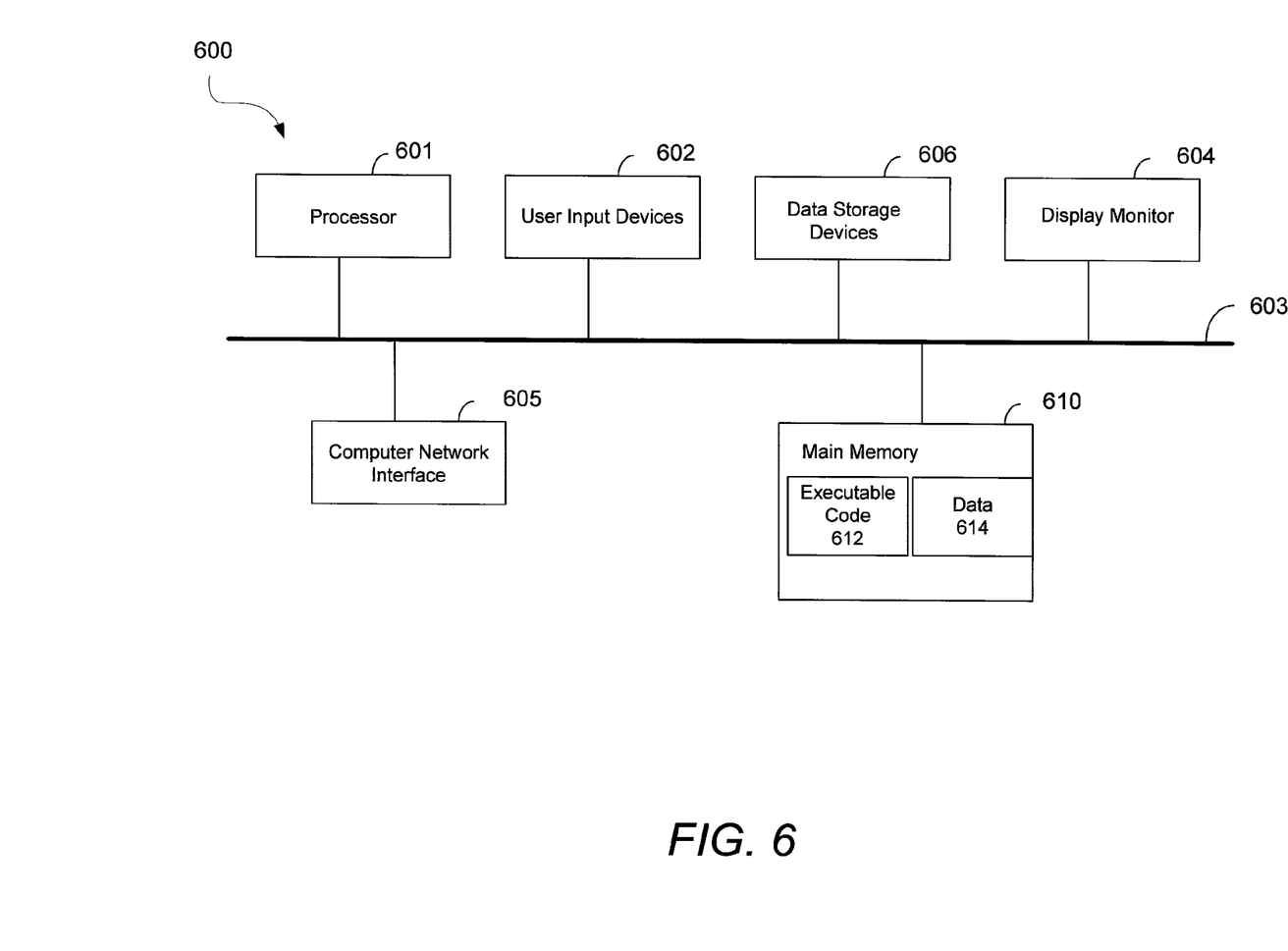
FIG. 6 is a diagram depicting components of an example computer apparatus which may be configured to execute computer-implemented methods disclosed herein in accordance with an embodiment of the invention.

FIG. 6 is a diagram depicting components of an example computer apparatus 600 which may be configured to execute computer-implemented methods disclosed herein in accordance with an embodiment of the invention. This figure shows just one example of a computer which may be used to perform the data processing methods described herein. Many other types of computers may also be employed, such as multi-processor computers, server computers, cloud computing via a computer network, and so forth.

The computer apparatus 600 may include a processor 601, such as those from the Intel Corporation of Santa Clara, Calif., for example. The computer apparatus 600 may have one or more buses 603 communicatively interconnecting its various components. The computer apparatus 600 may include one or more user input devices 602 (e.g., keyboard, mouse), a display monitor 604 (e.g., liquid crystal display, flat panel monitor, cathode ray tube), a computer network interface 605 (e.g., network adapter, modem), and a data storage system that may include one or more data storage devices 606 which may store data on a hard drive, optical disk, semiconductor-based memory, or other tangible non-transitory computer-readable storage media 607, and a main memory 610 which may be implemented using random access memory, for example.

In the example shown in this figure, the main memory 610 includes executable instruction code 612 and data 614. The executable instruction code 612 may comprise computer-readable program code (i.e., software) components which may be loaded from the tangible non-transitory computer-readable medium of the data storage device 606 to the main memory 610 for execution by the processor 601. In particular, the executable instruction code 612 may be configured to perform the data processing methods described herein.

Figure 7:
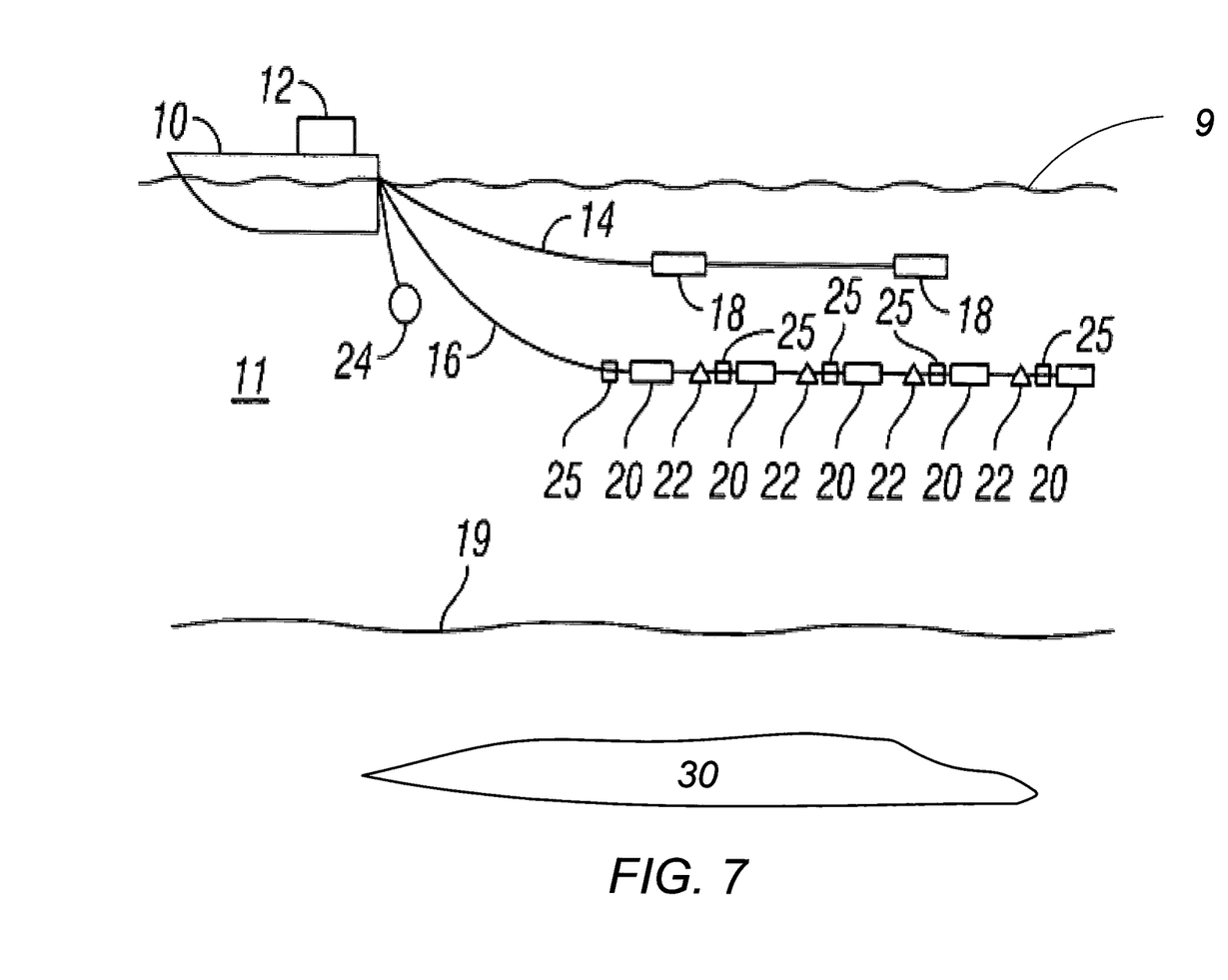
FIG. 7 depicts marine surveying apparatus which may be used for electromagnetic geophysical surveying in accordance with an embodiment of the invention.

FIG. 7 depicts marine surveying apparatus which may be used for electromagnetic geophysical surveying in accordance with an embodiment of the invention. As shown in FIG. 7, a survey vessel 10 may move along the surface 9 of a body of water 11, such as a sea, river, lake, or ocean.

The vessel 10 may include equipment which may be referred to as a recording system 12. The recording system 12 may include devices for applying electric current to an antenna or antennas, such as source electrodes 18 and/or other devices disposed on or along a source cable 14 towed by the vessel 10. The recording system 12 may also include navigation equipment for navigating the vessel 10, positioning equipment for determining the geodetic position of the vessel 10 and of components towed by the vessel 10 in the water 11, and a signal recording device for recording data such as signals detected by one or more sensors on one or more sensor cables 16. As shown, the sensor cable(s) 16 may also be towed by the vessel 10. Alternatively, sensor cable(s) 16 may be towed by another vessel (not shown), or the sensors may be located on or near the ocean bottom.

The source cable 14 in the present example may include an antenna consisting of multiple (two are shown in the illustrated example) source electrodes 18 disposed at spaced apart positions along the source cable 14. At selected times, certain of the equipment in the recording system 12 may conduct electric current across the source electrodes 18. The time varying component of such electric current produces an electromagnetic field that propagates through the water 11 and into the subsurface formations below the water bottom 19. The subsurface formations below the water bottom 19 may include, for example, a resistive anomaly region 30 whose characteristics may be the target of the surveying.

Electromagnetic geophysical data may be acquired as follows. Each sensor cable 16 may include a plurality of electromagnetic sensors 20 at spaced apart positions along the sensor cable 16. Each of the electromagnetic sensors 20 may measure a parameter related to the electromagnetic field resulting from interaction of the electromagnetic field imparted by the transmitter (e.g., source electrodes 18) into the subsurface formations below the water bottom 19. In the present example, the electromagnetic sensors may be a pair of receiver electrodes disposed at spaced apart positions along the sensor cable 16. An electric field component of the electromagnetic field resulting from interaction of the imparted electromagnetic field with the formations below the water bottom 19 may induce voltages across each of the pairs of receiver electrodes, and such voltages may be detected by a voltage measuring circuit. Such voltage measuring circuits may be disposed in the sensor cable 16 and/or in the recording system 12. Another example of an electromagnetic sensor that may be used is a single axis or multi-axis magnetometer, such as a flux gate magnetometer.

In some examples, the sensor cable 16 may also include seismic sensors 22, such as hydrophones and/or geophones, disposed at spaced apart locations along the sensor cable 16. For such examples where the sensor cable 16 includes seismic sensors, the survey vessel 10 or another vessel may tow a seismic energy source 24, such as an air gun or array of air guns. The seismic energy source 24 may be actuated at selected times by certain equipment in the recording system 12 and signals detected by the seismic sensors 22 may be recorded by a signal recording device in the recording system 12. During survey operations, seismic signals (e.g., seismic geophysical data) may be acquired substantially contemporaneously with electromagnetic signals (e.g., electromagnetic geophysical data) detected by the electromagnetic sensor 20 or may be acquired at other times.

Each sensor cable 16 may also include periodically-placed positioning transceivers 25. The positioning transceivers 25 may be used to determine the positions of the sensors as they are towed.

In accordance with an embodiment of the invention, a geophysical data product may be produced. The geophysical data product may include processed electromagnetic geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

The geophysical analysis may involve comparing an observed response to a theoretically-computed response. The theoretically-computed response may model the subsurface with conductors of various shapes and conductivities. The geophysical analysis may result in spatial distribution of conductivity that may be used to assist in the location and recovery of hydrocarbons, such as oil or natural gas.

One embodiment of the invention relates to a computer-implemented method for inverting an electromagnetic geophysical data signal to obtain an earth response. Quantified uncertainties associated with an electromagnetic geophysical data signal are computed. A subset of frequencies is selected based on the quantified uncertainties. The electromagnetic geophysical data signal is inverted for the subset of the frequencies to determine the earth response.

Another embodiment relates to an article of manufacture which includes at least one non-transitory, tangible storage medium containing instructions. The instructions, when executed, cause a computer to: compute quantified uncertainties associated with an electromagnetic geophysical data signal; select a subset of the frequencies based on the quantified uncertainties; and invert the electromagnetic geophysical data signal for the subset of the frequencies to determine the earth response.

Another embodiment relates to a computer that includes at least one processor and processing software that is executable on the at least one processor. The processing software is executable to compute quantified uncertainties associated with an electromagnetic geophysical data signal. The processing software is further executable to select a subset of the frequencies based on the quantified uncertainties and invert the electromagnetic geophysical data signal for the subset of the frequencies to determine the earth response.

Another embodiment relates to a method of geophysical surveying. Electromagnetic geophysical data is acquired. The electromagnetic geophysical data is inverted to obtain an earth response. The inversion involves computing quantified uncertainties associated with the electromagnetic geophysical data, selecting a subset of the frequencies based on the quantified uncertainties, and inverting the electromagnetic geophysical data for the subset of the frequencies to determine the earth response.

Another embodiment relates to a method of generating a geophysical data product. Electromagnetic geophysical data is obtained and processed to generate the data product. The processing includes inversion of the electromagnetic geophysical data. The inversion is performed by computing quantified uncertainties associated with the electromagnetic geophysical data, selecting a subset of the frequencies based on the quantified uncertainties, and inverting the electromagnetic geophysical data for the subset of the frequencies to determine the earth response.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of electromagnetic geophysical data acquisition and processing, the method comprising:
    acquiring an electromagnetic geophysical data signal using at least one electromagnetic source and a plurality of electromagnetic sensors;
    computing, using a computer apparatus comprising at least a processor, memory and executable code, quantified uncertainties associated with the electromagnetic geophysical data signal;
    selecting, using the computer apparatus, a subset of frequencies based on the quantified uncertainties by a process loop that computes quantified uncertainties for a plurality of candidate subsets of frequencies, each said candidate subset comprising a plurality of frequencies and including less than a set of all frequencies in the electromagnetic geophysical data signal, and selects one candidate subset of frequencies having a minimum quantified uncertainty;
    inverting, using the computer apparatus, the electromagnetic geophysical data signal for the subset of the frequencies to determine the earth response; and
    using the spatial distribution in locating hydrocarbons for recovery.

2. The method of claim 1, wherein the quantified uncertainty of the electromagnetic geophysical data signal for a specific frequency comprises a ratio of received noise to transmitted signal for the specific frequency.

3. The method of claim 2, wherein selecting the subset of the frequencies based on the quantified uncertainties comprises:
    sorting the frequencies according to the quantified uncertainties associated therewith; and
    selecting the frequencies that have lowest quantified uncertainties to be frequencies in the subset.

4. The method of claim 1, further comprising:
    computing the quantified uncertainties using a matrix of shifted source signal data and a noise covariance matrix.

5. The method of claim 4, further comprising:
    computing diagonal elements of a matrix $\Gamma=(R_g^{-1}+S^H R_v^{-1} S)^{-1}$, wherein S represents the matrix of the shifted source signal data, $R_g$ represents an earth response covariance matrix, $R_v$ represents the noise covariance matrix, $S^H$ represents a Hermetian conjugate of S, and the $^{-1}$ represents a matrix inversion operation; and
    determining the quantified uncertainties from the diagonal elements.

6. The method of claim 1, wherein the quantified uncertainty for a candidate subset of frequencies comprises an entropy of the candidate subset of frequencies.

7. The method of claim 1, wherein the quantified uncertainty for a candidate subset of frequencies comprises a volume of an uncertainty ellipsoid for the candidate subset of frequencies.

8. The method of claim 1, wherein the quantified uncertainty for a candidate subset of frequencies comprises a sensitivity-dependent variance for the candidate subset of frequencies.

9. The method of claim 8, wherein the sensitivity-dependent variance is computed using an estimated earth response shape in frequency space.

10. The method of claim 8, wherein the sensitivity-dependent variance is computed using a Jacobian matrix for sensitivity.

11. The method of claim 10, further comprising:
    using the earth response model with said at least one parameter as determined by the inversion as a starting point for a next iteration of the method.

12. The method of claim 1 further comprising:
    obtaining the electromagnetic geophysical data signal in a time domain; and
    applying a time-to-frequency domain transform to the electromagnetic geophysical data signal in the time domain to obtain the electromagnetic geophysical data signal for the frequencies in a frequency domain.

13. The method of claim 12, wherein the electromagnetic geophysical data signal in the time domain comprises a time series of data acquired using at least one marine-towed electromagnetic receiver.

14. The method of claim 1 further comprising:
    obtaining a sub-surface geophysical characteristic from the earth response model.

15. The method of claim 14, wherein the sub-surface geophysical characteristic comprises a sub-surface resistivity.

16. A system comprising:
    at least one electromagnetic source and a plurality of electromagnetic sensors for acquiring an electromagnetic geophysical data signal; and
    a computer apparatus comprising a processor, memory and instruction code, wherein the instruction code is configured to
        compute quantified uncertainties associated with an electromagnetic geophysical data signal;

select a subset of the frequencies based on the quantified uncertainties by a process loop that computes quantified uncertainties for a plurality of candidate subsets of frequencies, each said candidate subset comprising a plurality of frequencies and including less than a set of all frequencies in the electromagnetic geophysical data signal, and selects one candidate subset of frequencies having a minimum quantified uncertainty;

invert the electromagnetic geophysical data signal for the subset of the frequencies to determine an earth response; and use the earth response in locating hydrocarbons for recovery.

17. The system of claim 16, wherein the quantified uncertainty for a candidate subset of frequencies comprises an entropy of the candidate subset of frequencies.

18. The system of claim 16, wherein the quantified uncertainty for a candidate subset of frequencies comprises a volume of an uncertainty ellipsoid for the candidate subset of frequencies.

19. The system of claim 16, wherein the quantified uncertainty for a candidate subset of frequencies comprises a sensitivity-dependent variance for the candidate subset of frequencies.

20. A method of geophysical surveying, the method comprising:

acquiring electromagnetic geophysical data using at least one electromagnetic source and a plurality of electromagnetic sensors; and using computer apparatus comprising a processor, memory and executable code to invert the electromagnetic geophysical data to obtain an earth response by a process that includes computing quantified uncertainties associated with the electromagnetic geophysical data, selecting a subset of the frequencies based on the quantified uncertainties by a process loop that computes quantified uncertainties for a plurality of candidate subsets of frequencies, each said candidate subset comprising a plurality of frequencies and including less than a set of all frequencies in the electromagnetic geophysical data, and selects one candidate subset of frequencies having a minimum quantified uncertainty, inverting the electromagnetic geophysical data for the subset of the frequencies to determine the earth response, and using the earth response in locating hydrocarbons for recovery.

* * * * *